(12) United States Patent
Abelard et al.

(10) Patent No.: US 7,869,596 B2
(45) Date of Patent: Jan. 11, 2011

(54) METHOD OF RECORDING SCRAMBLED DIGITAL DATA, STORAGE MEDIUM AND METHOD OF READING SUCH DATA

(75) Inventors: Franck Abelard, Saint Armel (FR); Jean-François Vial, Rennes (FR); Eric Diehl, Liffré (FR); Jean-Louis Diascorn, Betton (FR)

(73) Assignee: Thomson Licensing, Boulogne-Billancourt (FR)

( * ) Notice: Subject to any disclaimer, the term of this patent is extended or adjusted under 35 U.S.C. 154(b) by 1110 days.

(21) Appl. No.: 10/776,560

(22) Filed: Feb. 11, 2004

(65) Prior Publication Data

US 2005/0105886 A1 May 19, 2005

(30) Foreign Application Priority Data

Feb. 11, 2003 (FR) .................................. 03 01857

(51) Int. Cl.
*G06F 21/00* (2006.01)
(52) U.S. Cl. ...................................... 380/210; 713/182
(58) Field of Classification Search ................. 380/210; 713/182
See application file for complete search history.

(56) References Cited

U.S. PATENT DOCUMENTS 6,662,198 B2 * 12/2003 Satyanarayanan et al. ... 707/204
6,956,869 B1 10/2005 Kato
7,079,752 B1 7/2006 Leyendecker
2004/0042418 A1 * 3/2004 Hamada et al. ............. 370/256
2004/0062398 A1 * 4/2004 Unger ........................ 380/277
2004/0083177 A1 * 4/2004 Chen et al. .................... 705/50

FOREIGN PATENT DOCUMENTS

| EP | 1215905 A | 6/2002 |
| EP | 04100220 | 5/2004 |
| JP | 2000-156838 | 6/2000 |
| JP | 2000-173181 | 6/2000 |
| JP | 2001-189914 | 7/2001 |
| WO | WO 03/107665 A | 12/2003 |

* cited by examiner

*Primary Examiner*—Christopher J Brown
(74) *Attorney, Agent, or Firm*—Robert D. Shedd; Joseph J. Oplach

(57) ABSTRACT

A method of recording scrambled digital data comprising the steps consisting in:
(a) receiving a scrambled digital data stream;
(b) identifying in the data stream a control packet (ECM) containing at least one key (CW) for descrambling at least a part of the data of the stream;
(c) storing the control packet in a table; and
(d) recording the data stream and the said table on a data storage medium.

A storage medium and a method of reading the recorded data are also proposed.

7 Claims, 5 Drawing Sheets

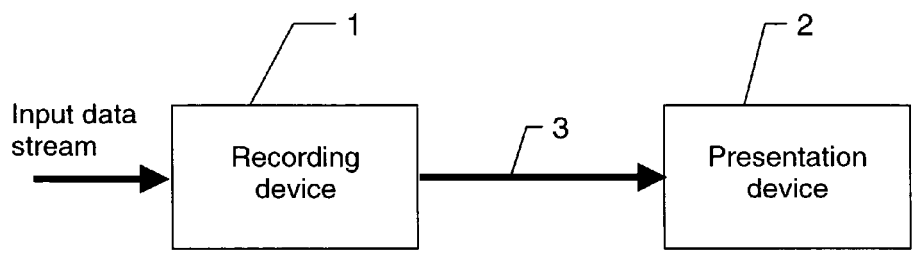
Fig. 2
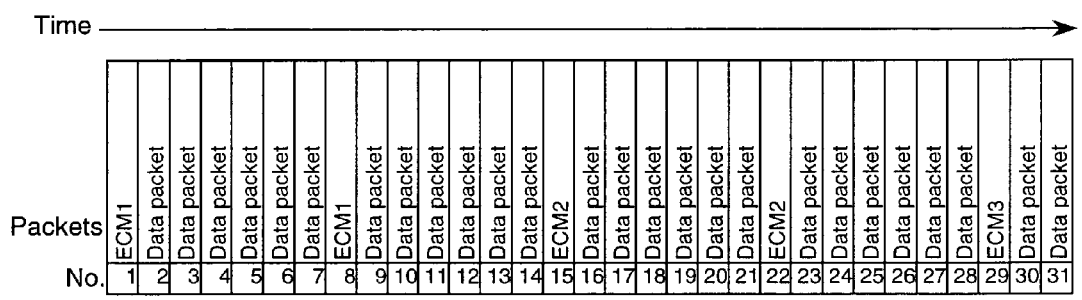
Fig. 3
| ECM Index | ECM packets |
|---|---|
| 1 | ECM1 |
| 15 | ECM2 |
| 29 | ECM3 |
| ... | ... |
Fig. 4

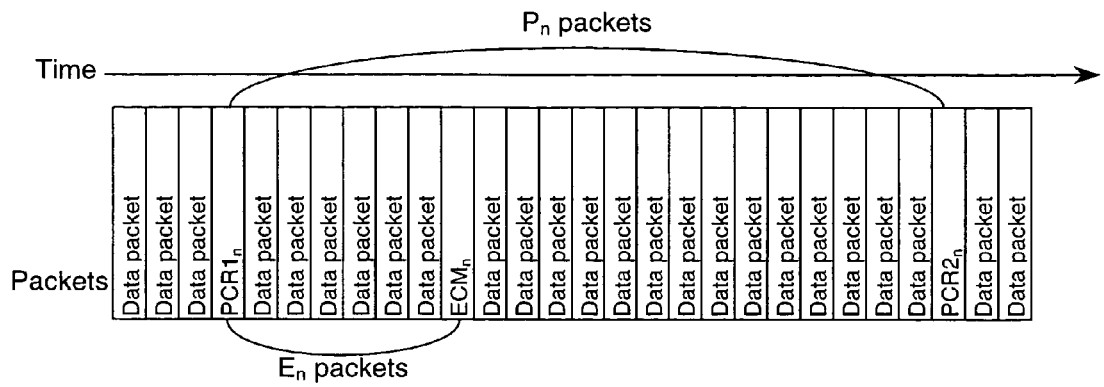
Fig. 5
| ECM Index | ECM packets |
|---|---|
| ... | ... |
| $ETS_{n-1}$ | $ECM_{n-1}$ |
| $ETS_n$ | $ECM_n$ |
| $ETS_{n+1}$ | $ECM_{n+1}$ |
| ... | ... |
Fig. 6
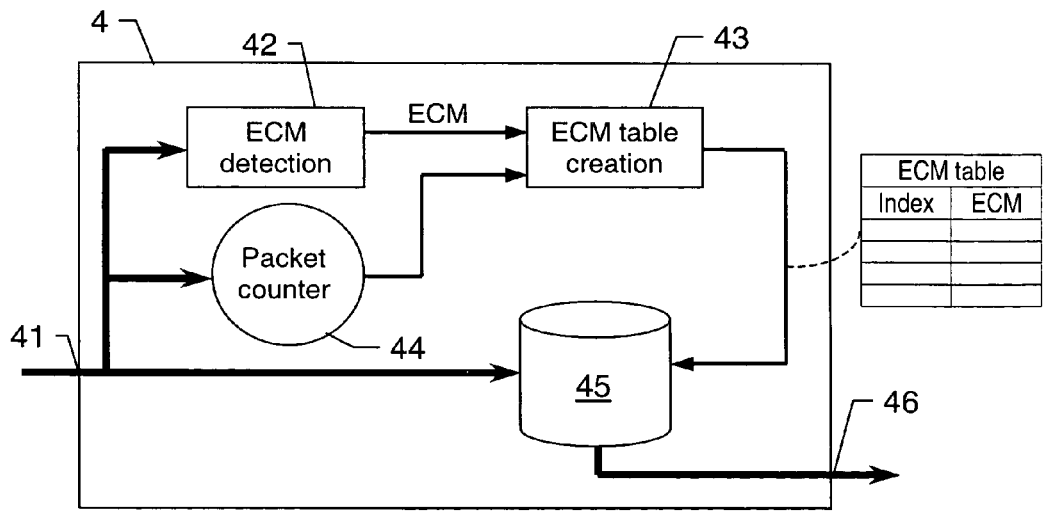
Fig. 7

METHOD OF RECORDING SCRAMBLED DIGITAL DATA, STORAGE MEDIUM AND METHOD OF READING SUCH DATA

BACKGROUND OF THE INVENTION

1. Field of the Invention

The present invention relates to the field of the recording of compressed and scrambled digital data. It is more particularly concerned with a method of recording scrambled digital data and a method of reading such data.

2. Description of the Related Art

Devices for recording compressed digital data streams in particular for recording digital television signals have now been around for some time. This type of device, which takes the form for example of a hard disk, thus offers the users the ability to record digital television programs that they can subsequently read back as they used to do previously with their video recorder for analogue television programs.

When data are recorded, in particular television programs, an attractive functionality consists in reading back these data according to particular modes of reading often referred to by the term "trick play modes", such as "backward play" or "fast forward" or even accelerated backward play. Another attractive mode consists in directly accessing a specific part of a program or in being able to make "jumps" in the data.

These modes of reading are not always easy to implement with digital data compressed and coded, for example according to the MPEG-2 standard. Specifically, the compression and coding techniques have been designed to be used essentially for the transmission of digital data. Consequently, it is envisaged that the decoding of the data be done in "forward play" mode at normal speed. When digital audio/video data compressed and coded according to the MPEG-2 standard has to be read in backward play mode for example, it may be necessary, in order to display certain images, to decode several images before being capable of displaying one of them.

When the recorded digital data are scrambled (one also speaks of "enciphered" or "encrypted" data), it is even more difficult to implement the "trick play" modes. It is in fact necessary to retrieve the descrambling keys before being able to descramble, then decode the data. According to the most conventional method of scrambling used in the field of digital pay-TV, the data descrambling keys are transmitted, in the digital data stream, in data packets denoted ECM (standing for "Entitlement Control Message"). The keys used to scramble the data (and which serve also to descramble them) are denoted CW (standing for "Control Word") and are changed periodically, typically every 10 seconds. The ECMs are transmitted in the data stream by being repeated every 100 ms for example and their content changes roughly every 10 seconds. In order to descramble a digital data packet, it is therefore necessary to retrieve firstly an ECM containing the CW key for descrambling this data packet.

An ECM customarily contains two CW keys: an even key and an odd key. The digital data transport packets, coded in particular according to the DVB standard (standing for "Digital Video Broadcasting") or according to the standard of the ATSC (standing for "Advanced Television Systems Committee") contain, in a header, a scrambling indicator (or "flag") indicating whether or not the packet is scrambled and if it is, whether it is scrambled with the even or odd key. An ECM therefore always contains the CW key necessary for descrambling the next data packet transmitted in the stream. The second CW key that it contains is useful, either for descrambling certain data packets transmitted before the ECM in the data stream, or for descrambling certain data packets transmitted after the ECM in the stream.

FIG. 1 diagrammatically illustrates this principle. We have represented a data stream 10 scrambled with various CW keys. We assume that the data packets 100 corresponding to the period n−1 have been scrambled with the key $CW_{n-1}$, the data packets 101 corresponding to the period n have been scrambled with the key $CW_n$ and the data packets 102 corresponding to the period n+1 have been scrambled with the key $CW_{n+1}$. Each "key period" which corresponds to the period during which a key is used to scramble the data lasts, according to the example of FIG. 1, 10 seconds.

In FIG. 1 we have also represented the ECMs which are transmitted in this data stream. For greater clarity, they are represented separately from the data stream but of course the ECMs are transmitted in practice in the data stream. They are transmitted, in the example represented in FIG. 1, every 100 ms and each contain, as made explicit at the bottom of FIG. 1, two CW keys. These keys are represented diagrammatically with crosshatching or square hatching corresponding to the period for which they are used to scramble the data of the stream 10. In FIG. 1, only period n is represented in full, accompanied by the end of period n−1 and by the start of period n+1.

As illustrated in FIG. 1, during a period n, the content of the ECMs transmitted in the data stream alters: at the start, the ECMs contain the key $CW_{n-1}$ corresponding to the previous period and the key $CW_n$ corresponding to the current period. Then, their content is modified and they contain the key $CW_n$ corresponding to the current period and the key $CW_{n+1}$ corresponding to the next period. The period during which a key CW is transmitted in the ECMs before the stream of data scrambled with this key CW is transmitted is referred to as "ECM Advance". This ECM Advance can last between 0 and the duration of the key period (10 s).

It may therefore be noted that, according to the direction of reading of the data stream and according to the reading speed, it may in certain cases be difficult to recover the CW key necessary in order to descramble the data before receiving the data. Specifically, it should be pointed out that the CW keys are transmitted in the ECMs by being encrypted and that they have to be decrypted, generally in a smart card linked up to the device for receiving the data stream, before being utilizable by this device for the descrambling of the data.

Document EP 1 143 722 A1 proposes a solution for facilitating the backward-play reading of this type of data stream consisting in inserting three CW keys into each ECM: a key for the current period, a key for the previous period and a key for the next period. This solution is not however satisfactory for the accelerated modes of reading (fast forward or accelerated backward play) and neither does it make it possible to perform fast "jumps" from one data block to another in a digital data stream.

SUMMARY OF THE INVENTION

The invention solves these problems by proposing a method of recording scrambled digital data comprising the steps consisting in: (a) receiving a scrambled digital data stream; (b) identifying in the data stream a control packet containing at least one key for descrambling at least a part of the data of the stream; (c) storing the control packet in a table; and (d) recording the data stream and the table on a data storage medium.

According to particular characteristics of the invention:
  in the case where the data stream received in step (a) comprises a plurality of control packets containing at least one descrambling key, the storage step (c) is carried out only if the control packet identified in step (b) is not already stored in the table;

in step (c), an index indicating the position of the control packet in the data stream is moreover stored in the table;

the index comprises a serial number of the control packet with respect to the first packet of the data stream recorded;

alternatively, the index comprises a time stamp associated with the control packet which defines its position in the data stream with respect to clock reference values transmitted in the data stream.

The invention also relates to a data storage medium, containing: a scrambled digital data stream comprising control packets each containing at least one key for descrambling a part of the digital data, the control packets being multiplexed with the data packets, characterized in that it furthermore contains a table, stored separately from the data stream and containing at least one control packet.

A data storage medium according to the invention can furthermore comprise one or more of the following characteristics:

the table also contains, for each control packet, an index indicating the position of the control packet in the data stream;

the index comprises a serial number of the control packet with respect to the first packet of the data stream recorded;

the index comprises a time stamp associated with the control packet which defines its position in the data stream with respect to clock reference values transmitted in the data stream.

The invention also relates to a method for reading scrambled digital data recorded in accordance with the preceding method, comprising the steps consisting in: (i) selecting a block of data from a stream of recorded data, (j) extracting from the table a control packet corresponding to this block of data; (k) extracting from the control packet a descrambling key; and (l) using the descrambling key to descramble the block of data and to supply its content in clear for presentation to a user.

The data reading method according to the invention can furthermore comprise one or more of the following characteristics:

step (k) of extracting a descrambling key from the control packet comprises a step of decrypting the control packet or the descrambling key;

the method furthermore comprises a step consisting in selecting the serial numbers of the first packet and of the last packet that are contained in the data block selected in step (i), and in step (j) the control packet or packets lying between and including that one having the highest index less than the serial number of the first packet of the data block and that one having the highest index less than the serial number of the last packet of the data block is or are extracted from the table;

the method furthermore comprises the steps consisting in: extracting from the data block at least one clock reference value, estimating, as a function of the clock reference value or values extracted, time stamps associated with the first packet and with the last packet that are contained in the data block selected in step (i), and extracting from the table, in step (j), the control packet or packets lying between and including that one having the highest index less than the time stamp associated with the first packet of the data block and that one having the highest index less than the time stamp associated with the last packet of the data block.

BRIEF DESCRIPTION OF THE DRAWINGS

The invention will be better understood on reading the description which follows, given merely by way of example and while referring to the appended drawings in which:

FIG. 2 illustrates an exemplary implementation of the invention.

FIGS. 3 and 4 illustrate a first method of indexing the ECMs to produce an ECM table according to a first embodiment of the invention.

FIGS. 5 and 6 illustrate a second method of indexing the ECMs to construct an ECM table according to a second embodiment of the invention.

FIGS. 7 and 8 represent details of the devices illustrated in FIG. 2 according to the first embodiment of the invention.

DETAILED DESCRIPTION OF THE PREFERRED EMBODIMENTS OF THE INVENTION

The basic idea of the invention is to create, during the recording of data, a table of ECMs in such a way as to very quickly retrieve the ECM containing the appropriate CW key during the reading of the recorded data. This advantageously makes it possible to gain access to the ECMs in advance with respect to the moment at which it is necessary to descramble the data and hence to be able to decrypt the ECMs in advance so as to retrieve the CW keys.

The invention therefore advantageously allows the carrying out of varied "trick play" modes on digital data that are scrambled when they are recorded.

The principle consists in recording an ECM table for each program recorded, this table containing all the ECMs necessary for descrambling the program. In particular, in the case where a program comprises streams of digital Audio and Video data and possibly streams of other data, all the ECMs necessary for descrambling these various streams are recorded in the ECM table for this program.

Figure 1:
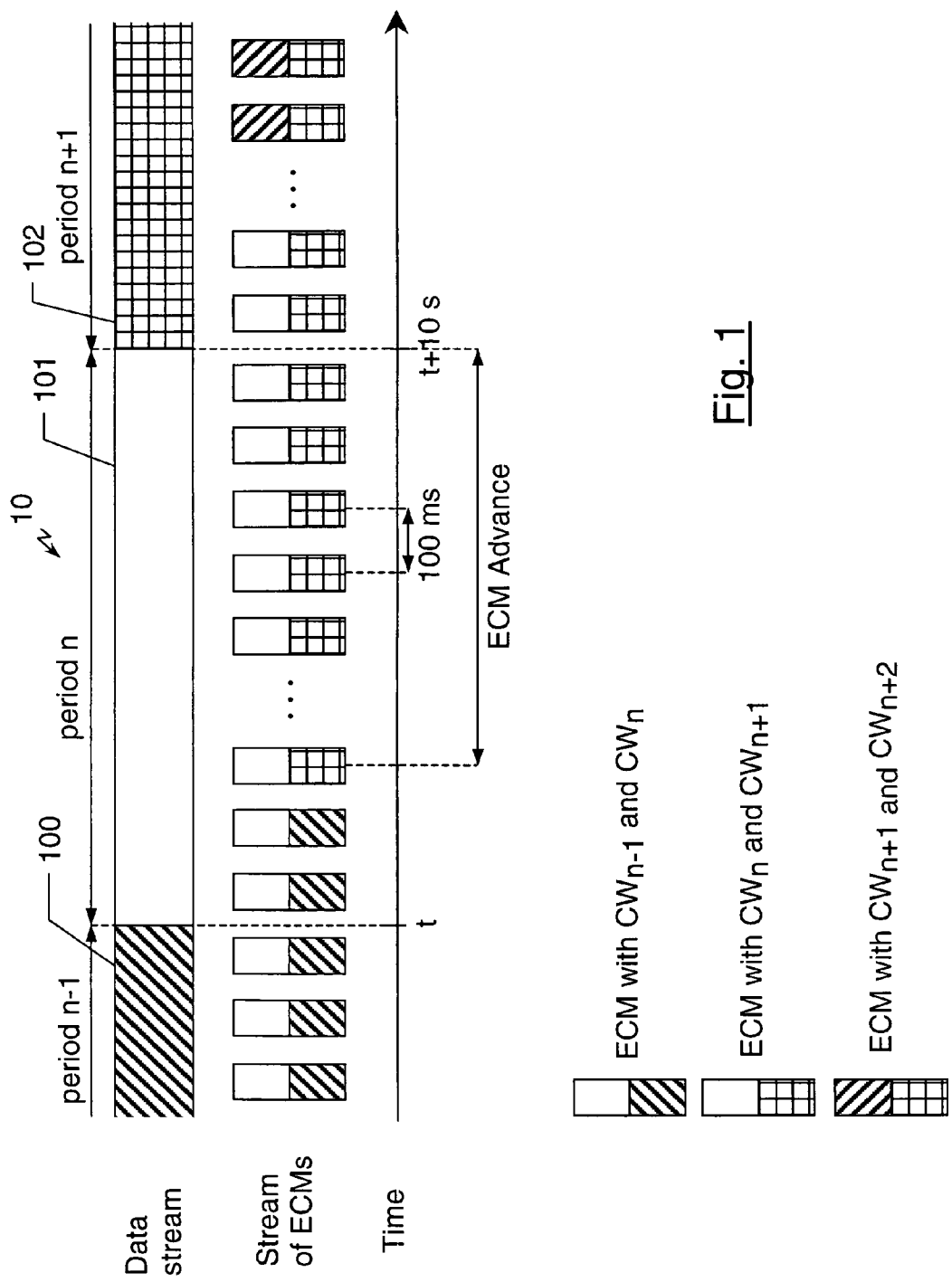
FIG. 1 diagrammatically illustrates a portion of a scrambled data stream.

It will also be noted that only the ECMs whose content differs with respect to that transmitted previously in the data stream are recorded in the ECM table. Thus, for that part of the data stream that is represented in FIG. 1, only the ECM containing the keys $CW_{n-1}$ and $CW_n$, the ECM containing the keys $CW_n$ and $CW_{n+1}$ and the ECM containing the keys $CW_{n+1}$ and $CW_{n+2}$ will be recorded in the ECM table. As the content of the ECMs changes roughly once per "key period" it is only necessary to record one of them per "key period".

According to another aspect of the invention, an ECM index is recorded in the ECM table, for each ECM recorded, in such a way as to be able subsequently to very quickly retrieve the ECM necessary for descrambling specified data packets.

This ECM index is produced, according to a first preferred embodiment by generating an ECM packet serial number indicating the position of the ECM in the data stream. According to a second embodiment, the ECM index is produced by calculating a stamp, that is to say a time stamp associated with the ECM defining its position in the data stream with respect to the value of the clock transmitted in the data stream.

In FIG. 2, we have represented an example of the practice of the invention. A recording device 1 receives a stream of input data to be recorded. This stream of digital data is typically scrambled according to the principle of digital pay-TV by control words—or keys—CW, the keys CW being renewed with a certain periodicity (for example every 10 seconds) and being inserted into control messages denoted ECM as is illustrated in FIG. 1 that has already been described.

The recording device comprises means of storing the recorded data, for example a hard disk, and is linked up via a digital bus 3 to a presentation device 2. The recording device can also be a digital video recorder that records data on magnetic media, such as cassettes, or else an optical disk writer that records data on optical media (such as CD—standing for "compact disc"—or DVD—standing for "digital versatile disc").

The presentation device 2 is for example a digital television receiver which contains at least elements for deciphering the ECMs, for descrambling the data received and for decoding them so as to present them to a user. The recorded data are typically audio/video data and their presentation to the user is performed by display on a screen as regards the video data and transmission on speakers as regards the audio data. The presentation device 2 also comprises a user interface allowing the user to read back the data recorded according to "trick play" modes such as, fast forward, backward play, slow motion, jumping from one program to another, etc.

The digital bus 3 is for example a bus according to the IEEE 1394 standard.

The invention is naturally not limited to this setup. In particular, it is possible for the recording device 1 and for certain elements (deciphering of the ECMs, descrambling and decoding of the data) of the presentation device to be included in one and the same appliance, such as a new-generation digital decoder comprising a hard disk. This appliance would in this case be linked to a traditional television for the presentation of the data to the user.

At the time of the recording of the data stream, the recording device 1 analyzes the stream so as to extract the ECMs and simultaneously create an ECM table containing all the ECMs that are necessary for descrambling the recorded part of the data stream. We shall assume hereinbelow that the user records audiovisual programs, transmitted according to the DVB digital television transmission standard and coded according to the MPEG-2 standard (ITU-T Rec. H.222.0 I ISO/IEC 13818-1) but the invention naturally applies to any type of digital data on which it may be useful to perform particular modes of reading ("trick play" modes), whether they are coded according to a compression standard other than the MPEG-2 standard or whether they are broadcast according to a broadcasting standard other than the DVB standard.

The ECMs corresponding to a specified program to be recorded are identified in the data stream by the PID (standing for "Packet Identifier") of the data transport packets that contain them. This PID is itself indicated in the PMT (standing for "Program Map Table") associated with each program transmitted. The recording device 1 uses this PID to extract the ECMs of a program that it records.

The process for recording the ECMs in the table is as follows: when the recording device 1 receives the first ECM of the recorded data stream, it stores it in the ECM table. When it receives the next ECM, it compares it with the one stored previously: if their content is identical, it takes no account thereof, otherwise it stores it too. The process continues thus with all the ECMs received.

By way of example, for a film lasting 2.5 hours (i.e. 9000 seconds), there will be roughly 900 different ECMs (since their content is renewed roughly every 10 seconds) if a single ECM stream is necessary for the audio and the video. Each ECM being stored in a 188-byte data transport packet (in the aforesaid MPEG standard), the ECM table will therefore have to contain 188×900 bytes, i.e. 169200 bytes.

The recording device 1 also creates, for each ECM recorded in the table, an index making it possible to store the position of the ECM in the data stream. This index, stored in the table, is thereafter used by the presentation device 2 to easily retrieve the ECM necessary for descrambling a specified part of the data.

We shall now describe a first method of indexing the ECMs in conjunction with FIGS. 3 and 4.

According to this preferred embodiment of the invention, the ECM index stored in the ECM table is created by calculating the serial number of each data packet containing an ECM in the data stream recorded with respect to the start of the recorded program. This serial number is calculated by counting the number of data packets since the start of the program.

In FIG. 3, we have represented in a simplified manner a data stream to be recorded comprising 31 data packets. The first packet (No. 1) contains an ECM: ECM1. The latter is therefore recorded in the ECM table whose content is represented in FIG. 4, with the index 1. The next ECM (at packet No. 8) in the data stream being the same (ECM1), it is not recorded. The next ECM (at packet No. 15) being different (ECM2), it is recorded in the ECM table with the index 15. One continues in the same manner until ECM3 (at packet 29) which is recorded with the index 29 in the ECM table.

A second method of indexing the ECMs is now described in conjunction with FIGS. 5 and 6.

According to this method, one seeks to allocate a time stamp to each packet containing an ECM which is to be stored in the ECM table. This index is denoted ETS (standing for "ECM Time Stamp") and is calculated from values of clock references that are transmitted in the data stream and that are denoted PCR (standing for "Program Clock Reference") in the aforesaid MPEG-2 standard.

The PCR values are situated in an adaptation field of the header of certain data packets. It will be noted that, even when the data (for example video) contained in the packet are scrambled, the header of the transport packet, which optionally comprises an adaptation field containing among other things a PCR value, is not scrambled. The PCR values are therefore accessible in clear.

The PCR values represent the values of a 27-MHz clock tick counter and are transmitted in the data packets with a certain periodicity.

The method of indexing of the second embodiment is performed as follows, illustrated by FIGS. 5 and 6: to calculate the index $ETS_n$ of an $ECM_n$ extracted from a recorded data stream, one recovers the value of $PCR1_n$ immediately preceding the $ECM_n$ and the value of $PCR2_n$ immediately following the $ECM_n$. One then counts the number of packets $P_n$ between the two values $PCR1_n$ and $PCR2_n$ transmitted and the number of packets $E_n$ between the value $PCR1_n$ and $ECM_n$ and it is thus possible to interpolate a virtual value of PCR corresponding to the packet containing the $ECM_n$.

This value $ETS_n$, which constitutes the index of the $ECM_n$ in the ECM table represented in FIG. 6, is calculated as follows:

$$ETS_n = PCR1_n + \frac{E_n(PCR2_n - PCR1_n)}{P_n}$$

Given the accuracy required for the PCR values in the MPEG-2 standard and their period of repetition in the data streams (they have to be transmitted at least every 0.1 s), this method of calculation makes it possible to ensure that each ECM that will have to be stored in the ECM table will have a different ETS index (roughly one ECM every 10 s—but this remains true even in the case where a different ECM is transmitted every second).

Once the ECM table has been constructed with an index for each ECM stored in the table, the latter is recorded with the data constituting the program that has just been recorded on an appropriate medium. Preferably, the ECM table is stored in the same file as that containing the audio/video data of the program, for example at the start of the file. The ECM table can also, as a variant, be stored in a different file from that containing the recorded program.

The ECM table can also be multiplexed with the data constituting the program. For example, when the data stored are in the MPEG 2 format, it is possible to create a "private section" according to MPEG 2 with a specific PID number and to store all the data packets forming the ECM table with this PID in their header.

In another variant where the program is recorded on a cassette, the ECM table will preferably be recorded at the start of the cassette.

It will be noted that the program which is recorded always contains the ECM packets in the data stream so that any device can always perform an ordinary reading of the data even if it is not equipped with means for managing "trick play" modes.

We shall now describe the manner in which a program's data recorded by the recording device 1 according to one of the methods seen hereinabove are read back by the presentation device 2, in particular when the data are read according to a "trick play" mode such as "fast forward", "backward play" or "jump to a specific location of the program".

To do this, the presentation device 2 recovers the data of a program as blocks of data containing several data packets which approximately represent a GOP (standing for "Group Of Pictures"), a concept that is defined in the MPEG-2 standard. When the data are scrambled, they have to be descrambled before any subsequent processing. The CW keys for descrambling the data block recovered must therefore be quickly retrieved and the ECM or ECMs containing the CW keys necessary for the descrambling of the data block must therefore be retrieved.

To do this, the ECM table stored with the data will be used. According to the method of indexing used to create the ECM table, a different method will be used to retrieve the ECMs containing the right CW keys.

When the ECMs are indexed according to the first method (ECM index formed of the packet serial numbers), it is necessary to retrieve the packet serial numbers (with respect to the first packet of the program recorded) of the data block recovered by the presentation device.

Any system for reading digital data is in general capable of indicating the "distance" N in bytes between the start of a file and a packet n of data which is extracted from the file. Knowing this number N and the size T of the data packets (for example for the transport packets according to the MPEG standard, the size is 188 bytes per packet), an index In of the data packet n is calculated:

$$I_n = \frac{N}{T}$$

Once this index $I_n$ has been calculated, the presentation device has to search the ECM table corresponding to the program that is currently being read for the ECM which has the highest index less than $I_n$. If this ECM contains two CW keys; an even key and an odd key, it is then necessary to look at the indicator located in the header of each data packet to be descrambled indicating whether the packet is scrambled with the aid of an even or odd key and to use the corresponding key of the ECM found to descramble the packet.

In certain cases it may happen that the data block recovered by the presentation device is such that it is necessary to retrieve several ECMs to descramble the data block. This can occur, for example, if the data block overlaps several key periods. Referring to FIG. 1, this could be the case if the data block recovered overlapped periods n−1, n and n+1. In this case, it would be necessary to recover the ECM containing $CW_{n-1}$ and $CW_n$ and the ECM containing $CW_n$ and $CW_{n+1}$.

To do this, in practice one calculates the index $I_{n1}$ of the first packet of the data block and the index $I_{n2}$ of the last packet of the data block. The ECM table is then searched for the $ECM_1$ having the highest index less than $I_{n1}$ and for the $ECM_2$ having the highest index less than $I_{n2}$ and all the ECMs between $ECM_1$ and $ECM_2$ may possibly be recovered. In most cases however, one and the same ECM will be found in the ECM table for the indices $I_{n1}$ and $I_{n2}$.

When the ECMs are indexed according to the second method using a stamp calculation (ETS) for each ECM, it is necessary to retrieve what would be the PCR value of the data packets belonging to the data block recovered by the presentation device 2.

As explained above, the PCR values are transmitted regularly in the data streams, at least every 0.1 s. Moreover, the amount of data for a GOP lasts roughly 0.5 s. When a data block of the approximate size of a GOP is recovered, there is therefore always at least one packet in the data block which contains a PCR value.

According to the number of PCR values present in the data block, we have two methods of determining the value of the stamp of the packets of the data block:

1/ A single PCR Value in the entire data block:

Let us assume that we seek to determine the stamp $STAMP_n$ of a data packet n of the data block (corresponding to the virtual PCR value for this packet) and let us assume that a PCR value has been found in a packet of the data block, then the value of the stamp is calculated as follows:

$$STAMP_n = PCR + \frac{D_n \times T_n \times F}{R_n} \text{ with:}$$

$D_n$ corresponding to the distance in terms of number of packets between packet n and the packet containing the PCR value ($D_n$ can be positive or negative);

PCR being the value of PCR found in the data block;

$R_n$ corresponding to the bit rate in bits/s of the data block;

F being the frequency of the system reference clock (customarily 27 MHz+/−810 Hz according to the MPEG 2 standard);

and $T_n$ corresponding to the size of the packets in bits (customarily 188×8 according to the MPEG 2 standard).

2/ Two or more PCR values contained in the entire data block:

To determine the value of the stamp $STAMP_n$ of a packet n of the data block containing at least two PCR values, we perform the following calculation:

$$STAMP_n = PCR1_n + \frac{D(PCR2_n - PCR1_n)}{P_n} \text{ with:}$$

$PCR1_n$ being the first PCR value closest to packet n;
$PCR2_n$ being the second PCR value closest to packet n;
$P_n$ corresponding to the number of packets between that containing $PCR1_n$ and that containing $PCR2_n$; and
$D_n$ corresponding to the distance in terms of number of packets between packet n and the packet containing $PCR1_n$ ($D_n$ can be positive or negative).

Once this stamp $STAMP_n$ has been calculated according to one of the above methods, the presentation device searches the ECM table for the value of the index $ETS_n$ which is just below but closest to the calculated value $STAMP_n$. The ECM stored at this index $ETS_n$ in principle contains the necessary key(s) for descrambling the packets of the data block.

As we have seen with regard to the previous embodiment, it is in certain cases necessary to retrieve several ECMs in order to descramble the data block.

This is why, we shall in practice proceed to the calculation of a stamp value $STAMP_{n1}$ for the first packet of the data block and $STAMP_{n2}$ for the last packet of the data block. The ECM table is then searched for $ECM_1$ and $ECM_2$ stored at the indices $ETS_1$ and $ETS_2$ whose values are less than and closest to the values $STAMP_{n1}$ and $STAMP_{n2}$ and all the ECMs between $ECM_1$ and $ECM_2$ may possibly be recovered. In most cases however, one and the same ECM will be found in the ECM table for the stamp values $STAMP_{n1}$ and $STAMP_{n2}$.

We shall now describe exemplary embodiments of recording devices or presentation devices that differ slightly depending on whether they use the first method of indexing the ECMs or the second method.

In FIG. 7, we have represented a recording device 4 according to a first embodiment. The latter comprises an input 41 for receiving a scrambled data stream to be recorded, representing for example an audiovisual program. It also comprises a module for detecting the ECMs 42 which extracts, in a manner known per se (on the basis of their PID for example), the ECMs from the data stream received. The recording device 4 also comprises a packet counter 44 which supplies a module for creating the ECM table 43 with a serial number for each packet of the data stream. The module for creating an ECM table 43 also receives the ECMs from the detection module 42 and it fills in an ECM table with the ECMs whose values differ from one another. It also stores in the ECM table the serial numbers of packets associated with each of these ECMs, these packet serial numbers constituting the indices of the ECMs. This ECM table is transmitted to a storage module 45 which records it with the data stream received on the input 41. The storage module 45 supplies the recorded data to an output 46 linked up preferably to a digital bus.

Figure 8:
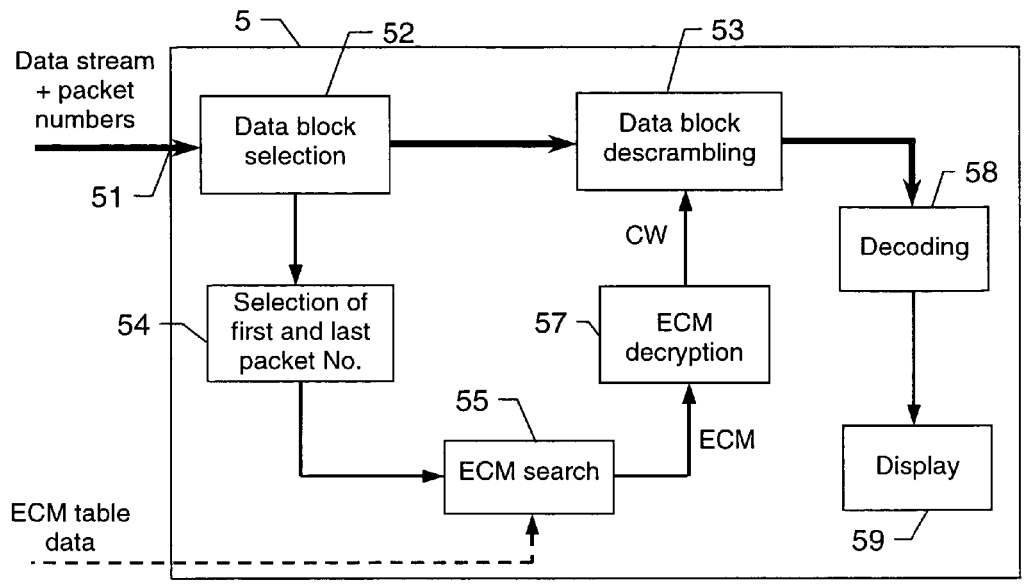

In FIG. 8, we have represented a presentation device 5 according to the first embodiment of the invention. This device receives on an input 51 a recorded data stream corresponding to a program. A module for selecting data blocks 52 asks the recording device for a particular data block in the program and for the serial numbers of the packets of this block in the recorded data stream. The serial numbers of the data packets are transmitted to a module 54 which selects the first and the last packet serial number of the data block. The module 54 records these serial numbers of the first and last packet and transmits them to an ECM search module 55. This ECM search module 55 asks the recording device to send it the ECM table of the program which is currently being read and it extracts therefrom, on the basis of these packet serial numbers and according to a method which was set forth above, the ECM containing the keys necessary for descrambling the packets of the data block received. The ECM is then transmitted to a decryption module 57 which extracts therefrom the descrambling key CW (or control word).

It will be noted that the module 57 can carry out the decryption of the ECMs only if it is authorized to do so and it possesses the key for decrypting the ECMs.

The CW key is finally used by a descrambling module 53 which descrambles the packets of the data block and sends them to a decoding module 58 which supplies the signals necessary for displaying the program to a display device 59 (which possesses a screen for the video and speakers for the audio if necessary).

Although the modules are represented here separately, they may naturally be situated in one and the same integrated circuit. Certain modules, such as the ECM decryption module 57 may also be situated in a smart card inserted into the presentation device.

It will also be noted that there are several possible variants for sending the ECM table of the recording device to the presentation device: either the ECM table is sent in its entirety at the start of the reading of the data (that is to say when the first data block of the recorded stream is processed by the presentation device). This variant is possible if the presentation device has enough memory available to store the table during the reading of the data. Another solution consists in sending the ECM table in pieces from the recording device to the presentation device as a function of the position of the packets of the data block transmitted in the stream.

Figure 9:
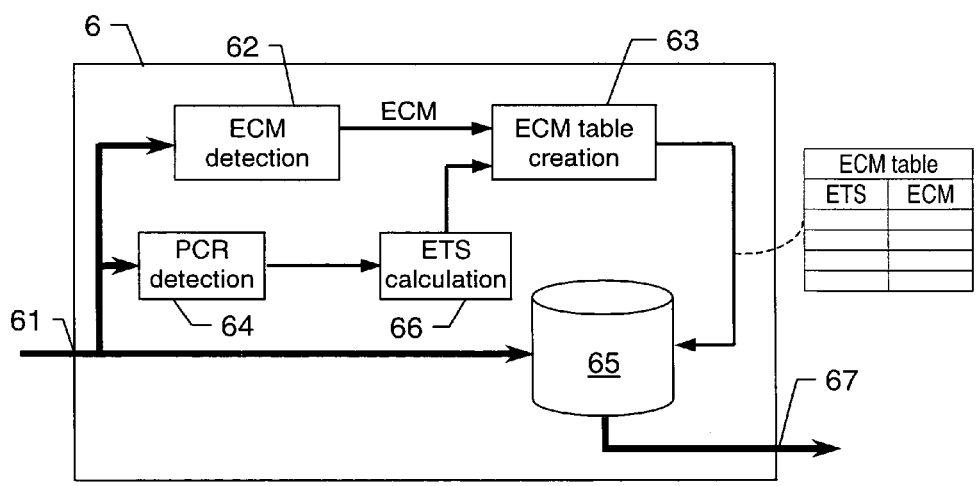
FIGS. 9 and 10 represent details of the devices illustrated in FIG. 2 according to the second embodiment of the invention.

In FIG. 9, we have represented a recording device 6 according to a second embodiment of the invention.

The recording device 6 comprises an input 61 for receiving a scrambled data stream to be recorded, representing for example an audiovisual program. It also comprises a module for detecting the ECMs 62 which extracts the ECMs from the data stream received. The recording device 6 also comprises a PCR detection module 64 which extracts the values of the PCR of the data packets received. These values are used as was seen above to calculate, in a module 66, estimated values of PCR (ETS stamps) for the packets containing the ECMs. The module for creating an ECM table 63 then associates the ECMs whose values differ from one another with the ETS stamps calculated by the module 66 to form the ECM table of the recorded program.

This ECM table is sent to a storage module 65 which records it with the data stream received on the input 61. The storage module 65 supplies the recorded data to an output 67 linked up preferably to a digital bus.

Figure 10:
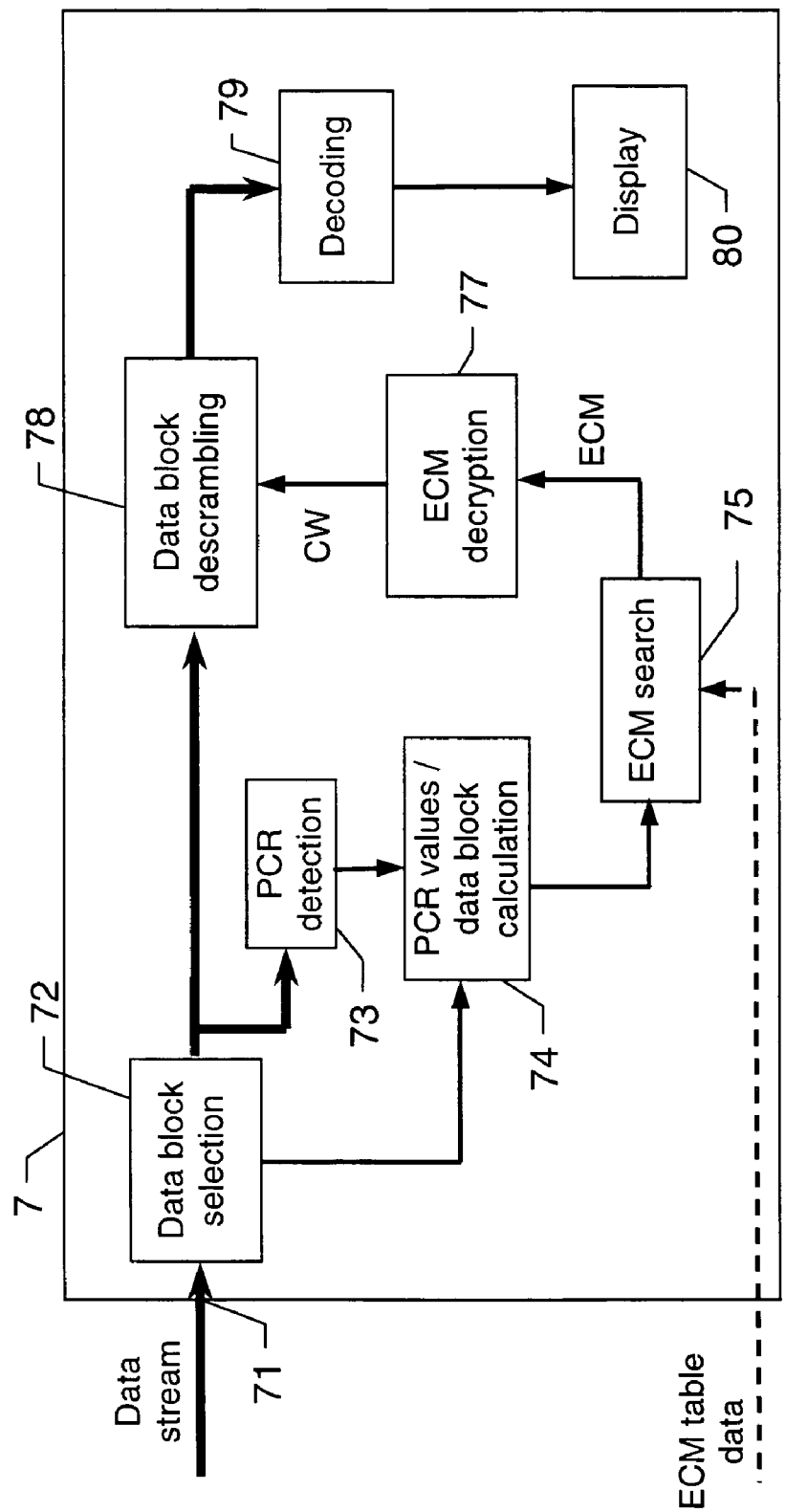

Finally, we have represented in FIG. 10 a presentation device 7 according to the second embodiment of the invention.

This device receives on an input 71 a recorded data stream corresponding to a program. A module for selecting data blocks 72 asks the recording device for a particular data block in the program. A PCR detection module 73 extracts from this data block the PCR value or values which are contained therein so as to send them to a module 74 for calculating PCR values estimated for the data block. This module 74 calculates, according to a method which was developed above, an estimated stamp value for the first and the last packet of the data block and it sends these values to the ECM search module 75.

This ECM search module 75 asks the recording device to send it the ECM table of the program which is currently being read and it extracts therefrom, on the basis of the estimated stamp values and according to a method which was set forth above, the ECM containing the keys necessary to descramble the packets of the data block received. The ECM is then transmitted to a decryption module 77 which extracts therefrom the descrambling key CW (or control word). It will be noted that the module 77 can carry out the decryption of the ECMs only if it is authorized to do so and possesses the key for decrypting the ECMs.

The CW key is finally used by a descrambling module 78 which descrambles the packets of the data block and sends them to a decoding module 79 which supplies the signals necessary for the displaying of the program to a display device 80 (which possesses a screen for the video and speakers for the audio if necessary).

The invention claimed is:

1. Method of recording scrambled digital data comprising the steps of:
   (a) receiving a scrambled digital data stream including a plurality of control packets containing at least one descrambling key; said at least one descrambling key having a periodically changing value, the at least one descrambling key of at least one of said plurality of control packets being identical to the at least one descrambling key of the preceding control packet;
   (b) identifying in said data stream said plurality of control packets containing said at least one key for descrambling at least a part of the data of the stream;
   (c) storing in a table said control packets containing said at least one descrambling key when said value changes; and not storing said control packets containing said at least one descrambling key when said value has not changed; and,
   (d) recording the data stream and said table on a data storage medium.

2. Method according to claim 1, wherein at step (c), an index indicating the position of the control packet in the data stream is stored in the table.

3. Method according to claim 2, wherein the index comprises a serial number of the control packet with respect to the first packet of the data stream recorded.

4. Method according to claim 2, wherein the index comprises a time stamp associated with said control packet which defines its position in the data stream with respect to clock reference values transmitted in the data stream.

5. Method according to claim 1, wherein said storing step further comprises forming said table of said descrambling keys in a sequence related to scrambling changes in said received digital data stream.

6. Method according to claim 1, wherein said storing step further comprises assembling said table of said descrambling keys with non-duplicate descrambling key values.

7. Method for recording comprising:
   (a) receiving a scrambled digital data stream including a plurality of control packets containing at least one descrambling key; said at least one descrambling key having a periodically changing value, the at least one descrambling key of at least one of said plurality of control packets being identical to the at least one descrambling key of the preceding control packet;
   (b) identifying in said data stream said plurality of control packets containing said at least one key for descrambling at least a part of the data of the stream;
   (c) creating a table of said control packets containing said descrambling key when said descrambling key value is absent from said table and not storing said control packets containing said at least one descrambling key when said value has not changed; and
   (d) recording said data stream and said table on a data storage medium.

* * * * *